US012605682B2

(12) United States Patent
Matsunaga et al.

(10) Patent No.: US 12,605,682 B2
(45) Date of Patent: Apr. 21, 2026

(54) LIQUID MIXING DEVICE AND LIQUID MIXING METHOD

(71) Applicant: Honda Motor Co., Ltd., Tokyo (JP)

(72) Inventors: Hiroki Matsunaga, Tokyo (JP); Masaki Shigekura, Tokyo (JP); Yuma Yoshikawa, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 537 days.

(21) Appl. No.: 18/171,664

(22) Filed: Feb. 21, 2023

(65) Prior Publication Data

US 2023/0285914 A1 Sep. 14, 2023

(30) Foreign Application Priority Data

Mar. 4, 2022 (CN) ........................ 202210213005.7

(51) Int. Cl.

| | |
|---|---|
| ***B01F 27/70*** | (2022.01) |
| ***B01F 23/40*** | (2022.01) |
| ***B01F 35/221*** | (2022.01) |
| ***B01F 35/71*** | (2022.01) |

(52) U.S. Cl.
CPC .............. *B01F 27/70* (2022.01); *B01F 23/40* (2022.01); *B01F 35/2211* (2022.01); *B01F 35/712* (2022.01)

(58) Field of Classification Search
CPC ........ B01F 23/40; B01F 23/43; B01F 27/112; B01F 27/1127
See application file for complete search history.

(56) References Cited

U.S. PATENT DOCUMENTS

| | | | | |
|---|---|---|---|---|
| 208,783 A * | 10/1878 | Baird | B01F 33/402 366/102 |
| 4,093,506 A * | 6/1978 | Richter | B01F 23/454 162/57 |
| 5,246,289 A * | 9/1993 | Middleton | B01F 27/15 416/243 |
| 7,153,480 B2 * | 12/2006 | Bickham | B01F 27/81 422/224 |

(Continued)

FOREIGN PATENT DOCUMENTS

| | | |
|---|---|---|
| CN | 105498603 | 4/2016 |
| CN | 206082295 | 4/2017 |
| CN | 110997122 | 4/2020 |

(Continued)

OTHER PUBLICATIONS

"Office Action of China Counterpart Application", with English translation thereof, issued on Jul. 31, 2025, pp. 1-14.

*Primary Examiner* — Elizabeth Insler
(74) *Attorney, Agent, or Firm* — JCIPRNET

(57) ABSTRACT

A liquid mixing device and a liquid mixing method are provided, which can suppress air from being mixed into liquids to generate air bubbles, and the structure is easy to clean, so that a high-quality mixed liquid can be obtained. The liquid mixing device is suitable for mixing multiple liquids and includes a stirring chamber; a supply portion, disposed on an inner surface of the stirring chamber to supply the liquids into the stirring chamber; a stirring component, disposed in the stirring chamber to stir the liquids supplied into the stirring chamber, and an opposing plate, disposed on the stirring component and disposed opposite to the supply portion.

6 Claims, 7 Drawing Sheets

100

(56) References Cited

U.S. PATENT DOCUMENTS

| | | | | |
|---|---|---|---|---|
| 2009/0253019 | A1* | 10/2009 | Yokozawa ............ | B01F 25/104 429/513 |
| 2020/0230560 | A1 | 7/2020 | Matsunaga et al. | |

FOREIGN PATENT DOCUMENTS

| | | |
|---|---|---|
| CN | 110997125 | 4/2020 |
| JP | 6804651 | 12/2020 |

* cited by examiner

LIQUID MIXING DEVICE AND LIQUID MIXING METHOD

CROSS-REFERENCE TO RELATED APPLICATION

This application claims the priority benefit of China application serial no. 202210213005.7, filed on Mar. 4, 2022. The entirety of the above-mentioned patent application is hereby incorporated by reference herein and made a part of this specification.

BACKGROUND

Technical Field

The disclosure relates to a liquid mixing device and a liquid mixing method, and in particular to a liquid mixing device and a liquid mixing method suitable for mixing multiple liquids.

Description of Related Art

In the prior art (Japanese Patent No. 6804651), there are liquid mixing devices suitable for mixing multiple liquids. Taking the mixing of liquid paints of multiple colors as an example, the liquid mixing device stirs the liquid paints of multiple colors in a stirring chamber, so as to mix and tone the liquid paints of multiple colors, and the mixed and toned liquid paint is then further transported to equipment such as a coating machine for coating. When mixing multiple liquids, the liquids may be scattered and mixed with air during the process of being supplied to the stirring chamber, which causes air bubbles to form in the mixed liquid, making it difficult to obtain a high-quality mixed liquid. However, if a baffle is disposed in the stirring chamber to suppress air from being mixed into the liquid, a region that is difficult to be cleaned may be formed near the baffle, which causes the liquid remaining in the stirring chamber to affect the next mixed liquid, making it difficult to obtain a high-quality mixed liquid.

SUMMARY

The disclosure provides a liquid mixing device, which is suitable for mixing multiple liquids and includes a stirring chamber; a supply portion, disposed on an inner surface of the stirring chamber to supply the liquids into the stirring chamber; a stirring component disposed in the stirring chamber to stir the liquids supplied into the stirring chamber; and an opposing plate, disposed on the stirring component and disposed opposite to the supply portion.

The disclosure provides a liquid mixing method, which is suitable for mixing multiple liquids using a liquid mixing device and includes an introducing step of supplying the liquids into a stirring chamber of the liquid mixing device from a supply portion disposed on an inner surface of the stirring chamber; and a mixing step of stirring the liquids supplied into the stirring chamber via a stirring component disposed in the stirring chamber. Also, in the introducing step, the stirring component is controlled, so that an opposing plate disposed on the stirring component is disposed opposite to the supply portion.

DETAILED DESCRIPTION OF DISCLOSED EMBODIMENTS

Figure 1:
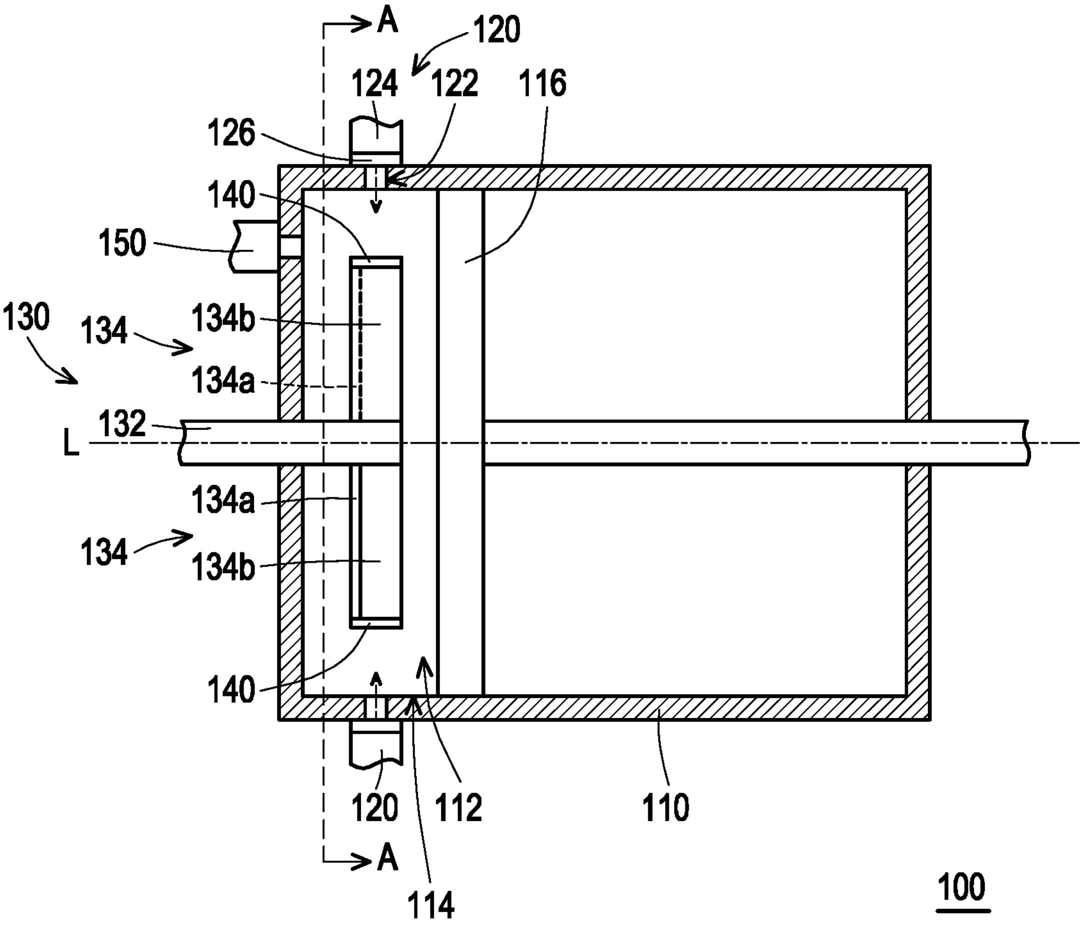
FIG. 1 is a side schematic view of a liquid mixing device according to an embodiment of the disclosure.

The disclosure provides a liquid mixing device and a liquid mixing method, which can suppress air from being mixed into a liquid to generate air bubbles, and the structure is easy to clean, so that a high-quality mixed liquid can be obtained.

The disclosure provides a liquid mixing device, which is suitable for mixing multiple liquids and includes a stirring chamber; a supply portion, disposed on an inner surface of the stirring chamber to supply the liquids into the stirring chamber; a stirring component disposed in the stirring chamber to stir the liquids supplied into the stirring chamber; and an opposing plate, disposed on the stirring component and disposed opposite to the supply portion.

In an embodiment of the disclosure, the supply portion includes an opening disposed on the inner surface of the stirring chamber, and a size of the opposing plate is greater than a size of the opening.

In an embodiment of the disclosure, multiple supply portions are disposed on the inner surface of the stirring chamber, and the opposing plate is moved to be disposed opposite to the supply portion supplying the liquid among the supply portions.

In an embodiment of the disclosure, the stirring chamber is formed in a cylindrical shape, the stirring component includes a rotating shaft extending along an axial direction of the stirring chamber and a blade portion extending radially outward from the rotating shaft, and the opposing plate is disposed at a front end of the blade portion.

In an embodiment of the disclosure, the opposing plate is moved by rotation of the stirring component, and when the liquid is being supplied into the stirring chamber, the stirring component stops rotating, so that the opposing plate is disposed opposite to the supply portion supplying the liquid.

In an embodiment of the disclosure, the opposing plate is formed in a concave shape recessed in a direction from the supply portion toward the stirring component.

In an embodiment of the disclosure, the concave shape of the opposing plate is V-shaped.

The disclosure provides a liquid mixing method, which is suitable for mixing multiple liquids using a liquid mixing device and includes an introducing step of supplying the liquids into a stirring chamber of the liquid mixing device from a supply portion disposed on an inner surface of the stirring chamber; and a mixing step of stirring the liquids supplied into the stirring chamber via a stirring component disposed in the stirring chamber. Also, in the introducing step, the stirring component is controlled, so that an opposing plate disposed on the stirring component is disposed opposite to the supply portion.

In an embodiment of the disclosure, in the introducing step, the stirring component is controlled, so that the opposing plate is disposed opposite to the supply portion supplying the liquid among the supply portions.

In an embodiment of the disclosure, in the introducing step, the liquids are sequentially supplied into the stirring chamber, and at least when the liquid supplied first among the liquids is being supplied into the stirring chamber, the stirring component is controlled, so that the opposing plate is disposed opposite to the supply portion supplying the liquid.

In an embodiment of the disclosure, in the introducing step, a volume of the cylindrical stirring chamber is gradually enlarged to sequentially supply the liquids into the stirring chamber. In the mixing step, the stirring component is rotated to stir the liquids. The stirring component includes a rotating shaft extending along an axial direction of the stirring chamber and a blade portion extending radially outward from the rotating shaft, and the opposing plate is disposed at a front end of the blade portion. In addition, when introducing the liquids after a second order among the liquids into the stirring chamber in the introducing step, the mixing step is performed.

Based on the above, in the liquid mixing device and the liquid mixing method of the disclosure, the opposing plate is disposed on the stirring component and is disposed opposite to the supply portion, such that in the introducing step of supplying the liquids into the stirring chamber, the stirring component is controlled, so that the opposing plate disposed on the stirring component is disposed opposite to the supply portion. In this way, during the introducing process of the liquid, the liquid supplied into the stirring chamber collides against the opposing plate disposed on the stirring component, thereby preventing the liquid from scattering and suppressing generation of air bubbles. In addition, the opposing plate disposed on the stirring component does not form a region that is difficult to be cleaned in the stirring chamber. Accordingly, the liquid mixing device and the liquid mixing method of the disclosure can suppress air from being mixed into the liquid to generate air bubbles, and the structure is easy to clean, so that a high-quality mixed liquid can be obtained.

Figure 2:
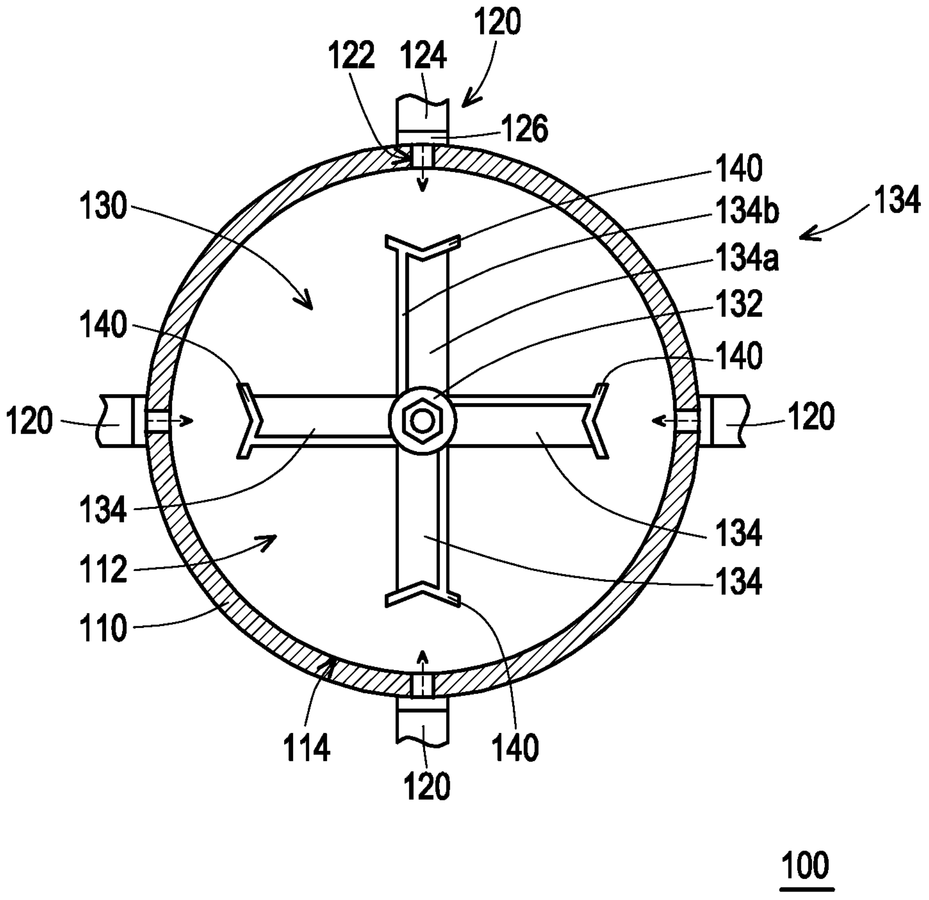
FIG. 2 is a cross-sectional schematic view of the liquid mixing device shown in FIG. 1 on a cross-section A-A.
Figure 3A:
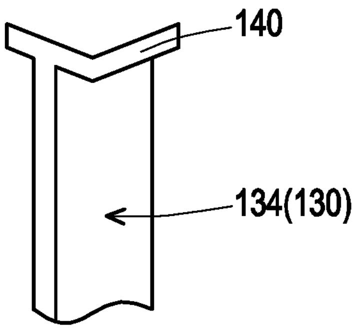
FIG. 3A is a partially enlarged schematic view of the liquid mixing device shown in FIG. 1 near an opposing plate.
Figure 3B:
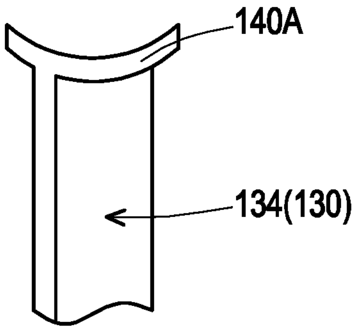
FIG. 3B and FIG. 3C are schematic views of variations of the opposing plate used in the liquid mixing device shown in FIG. 3A.
Figure 3C:
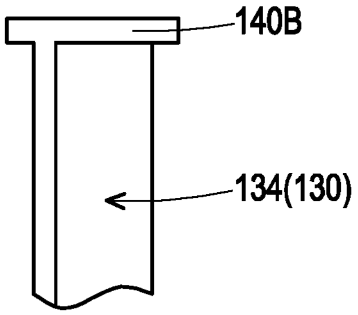
Figure 4:
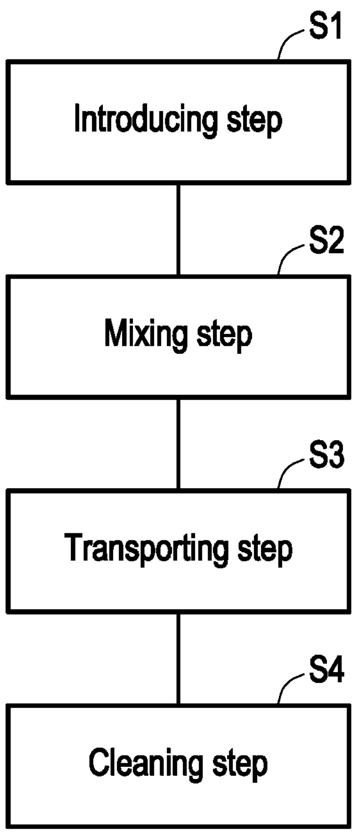
FIG. 4 is a flowchart of a liquid mixing method according to an embodiment of the disclosure.
Figure 5A:
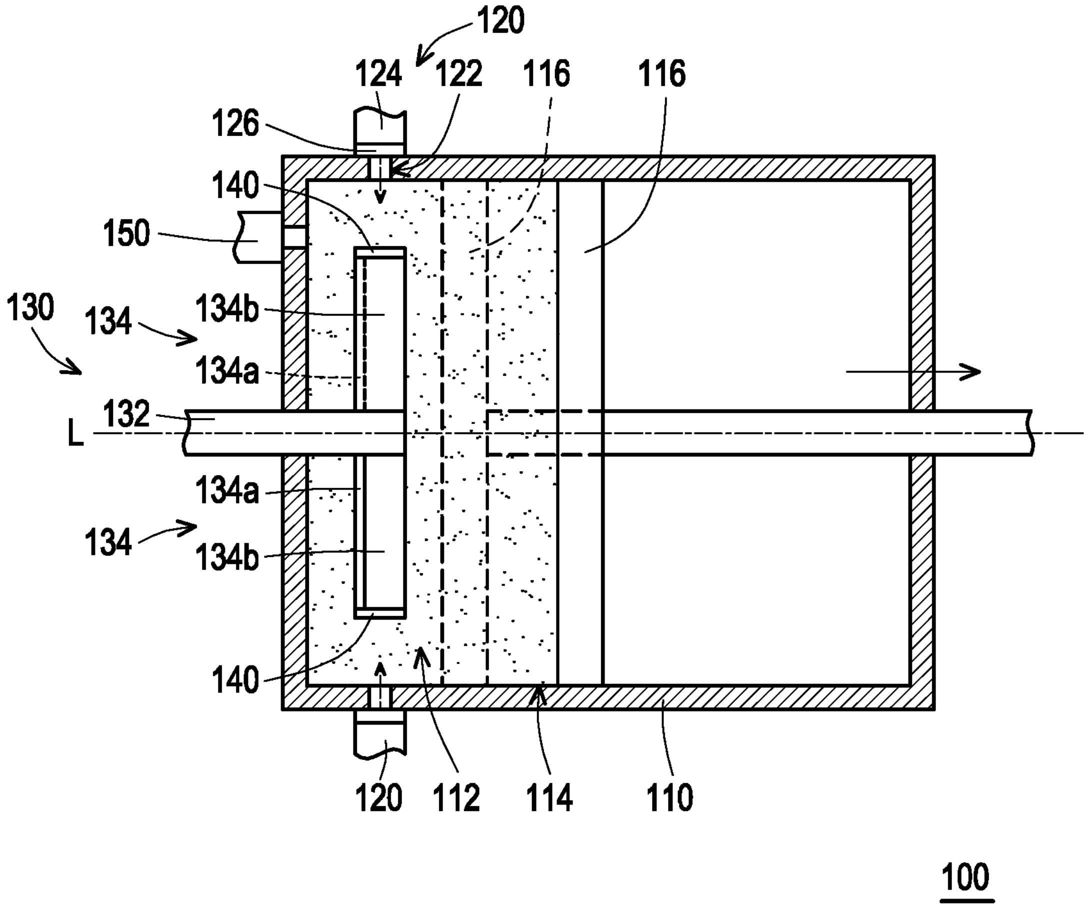
FIG. 5A to FIG. 5C are schematic views of an operation of the liquid mixing device used in the liquid mixing method shown in FIG. 4 in each step.
Figure 5B:
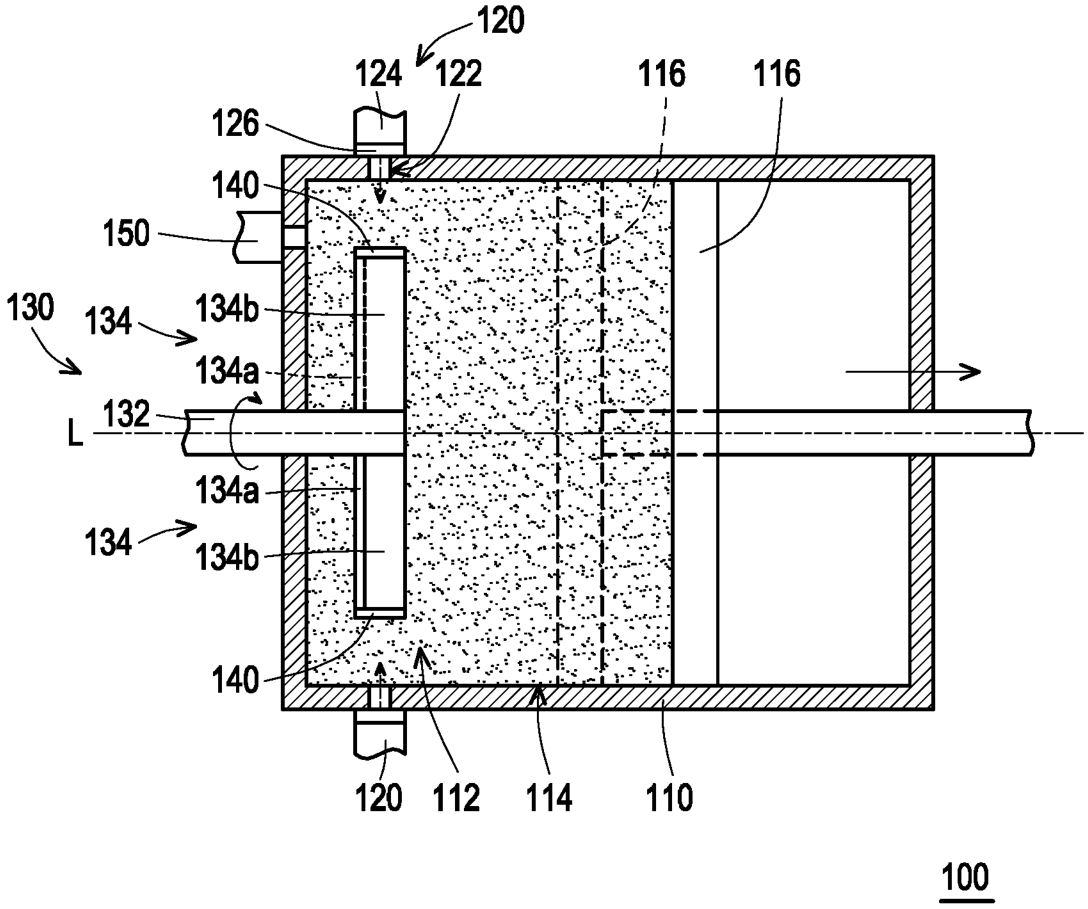
Figure 5C:
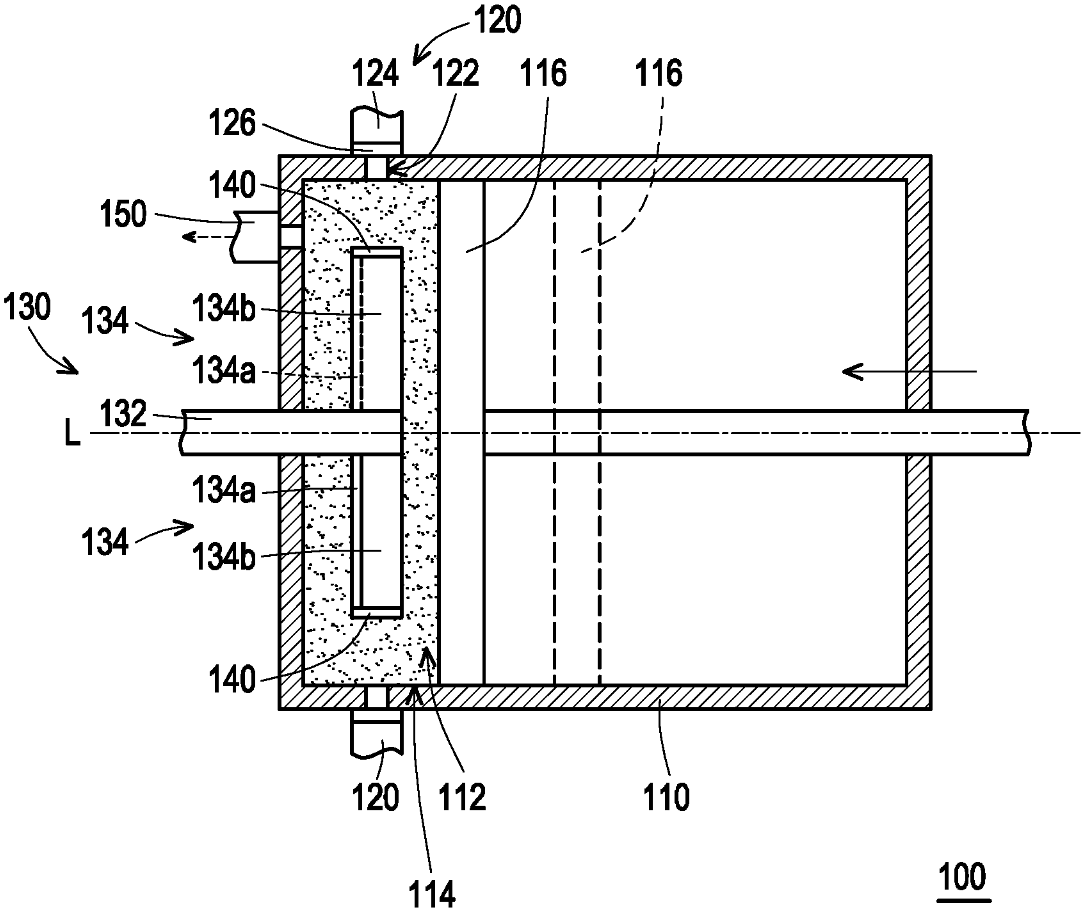

Reference will now be made in detail to the exemplary embodiments of the disclosure, examples of which are illustrated in the drawings. FIG. 1 is a side schematic view of a liquid mixing device according to an embodiment of the disclosure, FIG. 2 is a cross-sectional schematic view of the liquid mixing device shown in FIG. 1 on a cross-section A-A, FIG. 3A is a partially enlarged schematic view of the liquid mixing device shown in FIG. 1 near an opposing plate, FIG. 3B and FIG. 3C are schematic views of variations of the opposing plate used in the liquid mixing device shown in FIG. 3A, FIG. 4 is a flowchart of a liquid mixing method according to an embodiment of the disclosure, and FIG. 5A to FIG. 5C are schematic views of an operation of the liquid mixing device used in the liquid mixing method shown in FIG. 4 in each step. A liquid mixing device 100 and a liquid mixing method of the embodiment will be described below with reference to FIG. 1 to FIG. 5C, but the description is only an example of the disclosure, and the disclosure is not limited thereto.

Please refer to FIG. 1 and FIG. 2. In the embodiment, the liquid mixing device 100 includes a stirring chamber 110, a supply portion 120, a stirring component 130, and an opposing plate 140. The supply portion 120 is disposed on an inner surface 114 of the stirring chamber 110 to supply multiple liquids into the stirring chamber 110. The stirring component 130 is disposed in the stirring chamber 110 to stir the liquids supplied into the stirring chamber 110. The opposing plate 140 is disposed on the stirring component 130 and is disposed opposite to the supply portion 120. In this way, during the introducing process of the liquid, the liquid supplied into the stirring chamber 110 collides against the opposing plate 140 disposed on the stirring component 130 (as shown by the dotted arrows of FIG. 1 and FIG. 2), thereby preventing the liquid from scattering and suppressing generation of air bubbles. In addition, the opposing plate 140 disposed on the stirring component 130 does not form a region that is difficult to be cleaned in the stirring chamber 110. Accordingly, the liquid mixing device 100 can suppress air from being mixed into the liquid to generate air bubbles, and the structure is easy to clean, so that a high-quality mixed liquid can be obtained.

In detail, in the embodiment, as shown in FIG. 1 and FIG. 2, the stirring chamber 110 is, for example, a cylindrical cylinder structure, thus having an internal space 112 for accommodating the liquids. The supply portion 120 includes an opening 122 disposed on the inner surface 114 of the stirring chamber 110, a distribution pipeline 124 connected to the opening 122 from an external part of the stirring chamber 110, and a switching valve 126 for switching the opening 122 disposed on the inner surface 114 of the stirring chamber 110. The switching valve 126 precisely controls the amount of liquid supplied to the stirring chamber 110 via switching the opening 122, but the disclosure is not limited thereto. The stirring component 130 includes a rotating shaft 132 extending along an axial direction L of the stirring chamber 110 and a blade portion 134 extending radially outward from the rotating shaft 132. Furthermore, the opposing plate 140 is disposed on the stirring component 130, for example, disposed at a front end of the blade portion 134 (as shown in FIG. 2), but the disclosure is not limited thereto. Thus, the stirring component 130 can drive the blade portion 134 to rotate around the rotating shaft 132 to stir the liquids supplied into the stirring chamber 110. Preferably, the blade portion 134 extends to be close to the supply portion 120 such that the opposing plate 140 does not contact the supply portion 120 when rotating. As a result, the blade portion 134 is enlarged radially outside the stirring chamber 110 to improve stirring performance, and the opposing plate 140 is close to the supply portion 120, thereby preventing the liquid from scattering and suppressing generation of air bubbles.

From this, it can be seen that in the embodiment, when the liquid is being supplied into the stirring chamber 110, the stirring component 130 stops rotating, so that the opposing plate 140 is disposed opposite to the supply portion 120 supplying the liquid. After the step of introducing the liquid is completed, the stirring component 130 starts to rotate, so as to stir the liquid supplied into the stirring chamber 110. At this time, it does not matter even if the opposing plate 140 is not disposed opposite to the supply portion 120 due to the rotation. When the liquid is supplied to the stirring chamber 110 again, the stirring component 130 stops rotating again, so that the opposing plate 140 is disposed opposite to the supply portion 120 supplying the liquid, and after the step of introducing the liquid is completed again, the stirring component 130 starts to rotate again, so as to stir the liquid supplied into the stirring chamber 110. The above steps are repeated until all liquids to be mixed are introduced and stirred. As such, the liquid mixing device 100 is suitable for mixing multiple liquids.

Furthermore, in the embodiment, there are multiple (for example, four) supply portions 120 disposed at equal intervals on the inner surface 114 of the stirring chamber 110, so that the liquids can be supplied into the stirring chamber 110 through different supply portions 120, that is, each supply portion 120 supplies only one of the liquids. However, in other embodiments not shown, there may be only one supply portion 120, and the liquids may be sequentially supplied into the stirring chamber 110 via the same supply portion 120. It is also possible to adopt a combination other than the opening 122 and the distribution pipeline 124 as the supply portion 120. The disclosure does not limit the number, the position, and the specific structure of the supply portion 120, which may be adjusted according to requirements.

Furthermore, in the embodiment, the stirring component 130 is provided with multiple (for example, four) blade portions 134, and the blade portions 134 are disposed at equal intervals on an outer periphery of the rotating shaft 132, so that multiple liquids can be uniformly stirred in the cylindrical stirring chamber 110. Furthermore, the blade portion 134 has a bottom surface 134*a* substantially perpendicular to the axial direction L and a side surface 134*b* erected on the bottom surface 134*a* along the axial direction L, which can improve the stirring effect compared with a thin blade portion. However, in other embodiments not shown, the stirring component 130 may also be provided with only one blade portion 134. The blade portion 134 may be formed in a thin shape. It is also possible to adopt a combination other than the rotating shaft 132 and the blade portion 134 to serve as the stirring component 130. The disclosure does not limit the specific structure of the stirring component 130.

In addition, in the embodiment, multiple (for example, four) opposing plates 140 are correspondingly provided, that is, one opposing plate 140 is correspondingly provided at the front end of each blade portion 134. In this way, when the liquid is being supplied into the stirring chamber 110, the opposing plate 140 is moved to be disposed opposite to the supply portion 120 supplying the liquid among the supply portions 120. In the case where the opposing plate 140 is disposed opposite to the supply portion 120 supplying the liquid, the stirring component 130 stops rotating, and the liquid is supplied into the stirring chamber 110 via the corresponding supply portion 120. Then, the liquid supplied into the stirring chamber 110 collides against the opposing plate 140 disposed on the stirring component 130, thereby suppressing generation of air bubbles. However, in other embodiments not shown, only one opposing plate 140 may be provided. During the process of sequentially supplying multiple liquids into the stirring chamber 110, the opposing plate 140 is moved via the rotation of the stirring chamber 110, so as to be disposed opposite to the supply portion 120 supplying the liquid. The disclosure does not limit the number and the position of the opposing plates 140, which may be adjusted according to requirements.

Furthermore, in the embodiment, as shown in FIG. 1 and FIG. 2, the opposing plate 140 is disposed at the front end of the blade portion 134 of the stirring component 130, for example, erected on the bottom surface 134*a* of the blade portion 134 and connected to the side surface 134*b*, so as to form a plate structure with a size equal to or greater than the size of the front end of the blade portion 134. Preferably, the size of the opposing plate 140 is greater than the size of the opening 122 of the supply portion 120, and the opposing plate 140 is formed in a concave shape recessed in a direction from the supply portion 120 toward the stirring component 130. For example, as shown in FIG. 3A, the concave shape of the opposing plate 140 is V-shaped. Thus, a space between the opposing plate 140 and the supply portion 120 is increased due to the concave shape and the large size of the opposing plate 140, so as to increase the effect of the liquid colliding against the opposing plate 140, thereby more effectively suppressing generation of air bubbles. However, in other variations, the shape of the opposing plate 140A may be an arced concave shape as shown in FIG. 3B or the opposing plate 140B may also be configured without the concave shape to form a plane as shown in FIG. 3C. Moreover, the size of the opposing plate 140 is not limited to be greater than the size of the opening 122 of the supply portion 120. It is sufficient that the liquid supplied from the supply portion 120 can collide against the opposing plate 140. The disclosure does not limit the specific structure of the opposing plate 140, which may be adjusted according to requirements.

Please refer to FIG. 4. In the embodiment, the liquid mixing method is used to mix multiple liquids using the liquid mixing device 100. The liquid mixing method includes an introducing step S1, a mixing step S2, a transporting step S3, and a cleaning step S4. Here, in the introducing step S1, the liquids are supplied into the stirring chamber 110 from the supply portion 120 disposed on the inner surface 114 of the stirring chamber 110 of the liquid mixing device 100. Furthermore, in the introducing step S1, the stirring component 130 is controlled, so that the opposing plate 140 disposed on the stirring component 130 is disposed opposite to the supply portion 120. Furthermore, in the mixing step S2, the liquids supplied into the stirring chamber 110 are stirred via the stirring component 130 disposed in the stirring chamber 110. Subsequently, in the transporting step S3, the mixed liquid after stirring is transported to an equipment (for example, a coating machine) applying the mixed liquid. Furthermore, in the cleaning step S4, the stirring chamber 110 and the supply portion 120, the stirring component 130, and the opposing plate 140 disposed in the stirring chamber 110 are cleaned.

More specifically, in the embodiment, preferably, in the introducing step S1, the liquids are sequentially supplied into the stirring chamber 110. The sequential supply into the stirring chamber 110 means that the supply portion 120 supplies one liquid at a time. When multiple supply portions 120 are provided, the supply portions 120 may be connected to the liquids and opened in turn, so as to supply one liquid at a time. It is also possible that the liquids are sequentially supplied by the same supply portion 120 (one or more). In addition, in the introducing step S1, the stirring component 130 is controlled, so that the opposing plate 140 is disposed opposite to the supply portion 120 supplying the liquid among the supply portions 120.

In addition, in the embodiment, the mixing step S2 may be performed after the liquids are sequentially supplied to the stirring chamber 110, that is, the mixing step S2 is performed only once. Alternatively, stirring may be performed after at least one of the liquids is supplied to the stirring chamber 110, that is, the introducing step S1 and the mixing step S2 are repeated in turn. After the introducing step S1 and the mixing step S2 are completed, the transporting step S3 and the cleaning step S4 are performed. However, the disclosure does not limit the implementation of the transporting step S3 and the cleaning step S4, which may be adjusted according to requirements. In the following, the introducing step S1 and the mixing step S2 are repeated in turn as an example for illustration.

First, in the embodiment, as shown in FIG. 5A, the introducing step S1 for the first time is performed, and the liquid in the first order among the liquids is supplied from the supply portion 120 disposed on the inner surface 114 of the stirring chamber 110 into the stirring chamber 110. The liquid may be supplied into the stirring chamber 110 from one or more supply portions 120, but the disclosure is not limited thereto. Preferably, in the introducing step S1, the volume of the cylindrical stirring chamber 110 is gradually enlarged to sequentially supply the liquids into the stirring chamber 110. For example, a movable plate 116 forming a bottom surface of the stirring chamber 110 is driven via a driving source (for example, a motor) not shown to move along the axial direction L (as shown by the solid arrow of FIG. 5A), so that the internal space 112 of the stirring chamber 110 gradually widens, and at the same time, the supply portion 120 supplies the liquid in the first order into the stirring chamber 110 (shown by the dotted arrow of FIG. 5A). At this time, there is only one liquid (the liquid in the first order) in the stirring chamber 110, so the stirring may not be performed, but the disclosure is not limited thereto.

Next, in the embodiment, as shown in FIG. 5B, the introducing step S1 for the second time is performed, and the liquid in the second order among the liquids is supplied from the supply portion 120 into the stirring chamber 110. Preferably, when introducing the liquids after the second order among the liquids into the stirring chamber 110 in the introducing step S1, the mixing step S2 is performed. In the mixing step S2, the stirring component 130 is rotated to stir the liquids. In other words, the mixing step is performed only when there are two or more liquids in the stirring chamber 110, and the introducing step S1 for the second time and the mixing step S2 for the first time are simultaneously performed. However, in other embodiments not shown, the mixing step S2 for the first time may also be performed after the introducing step S1 for the second time is completed, and the disclosure is not limited thereto. When there are liquids above the third order, the above steps are repeated to perform the introducing step S1 for the third time and the mixing step S2 for the second time. The introducing step S1 for the third time and the mixing step S2 for the second time may be simultaneously or sequentially performed, and so on, but the disclosure is not limited thereto, which may be adjusted according to requirements.

Furthermore, in the embodiment, in the introducing step S1, at least when the liquid supplied first among the liquids is being supplied into the stirring chamber 110 (that is, when the introducing step S1 for the first time is performed), the stirring component 130 is controlled, so that the opposing plate 140 is disposed opposite to the supply portion 120 supplying the liquid. In this way, during the introducing process of the liquid, the liquid supplied into the stirring chamber 110 collides against the opposing plate 140 disposed on the stirring component 130, thereby preventing the liquid from scattering and suppressing generation of air bubbles. When introducing the liquids after the second order among the liquids into the stirring chamber 110, since the liquid supplied first is already present in the stirring chamber 110, the liquids after the second order have a low probability of generating air bubbles during the introducing process. Therefore, it is not limited whether to control the stirring component 130, so that the opposing plate 140 is disposed opposite to the supply portion 120 supplying the liquid, which may be adjusted according to requirements.

Next, in the embodiment, as shown in FIG. 5C, after the introducing step S1 and the mixing step S2 of the liquids are completed, the transporting step S3 is performed. In the transporting step S3, the mixed liquid is discharged out of the stirring chamber 110. The discharging manner is that, for example, the movable plate 116 forming the bottom surface of the stirring chamber 110 is driven via a driving source (for example, a motor) not shown to move along the axial direction L (as shown by the solid arrow of FIG. 5C), such that the internal space 112 of the stirring chamber 110 is gradually reduced (the volume of the stirring chamber 110 is gradually reduced), so that the mixed liquid is discharged out of the stirring chamber 110 via a discharging portion 150 disposed on the inner surface 114 of the stirring chamber 110 (as shown by the dotted arrow of FIG. 5C), and the mixed liquid discharged via the discharging portion 150 is further transported to an equipment (for example, a coating machine) applying the mixed liquid via a transporting pipeline not shown. However, the disclosure is not limited thereto, which may be adjusted according to requirements.

Finally, in the embodiment, after the mixed liquid is discharged out of the stirring chamber 110, the cleaning step S4 is performed. In the cleaning step S4, the stirring chamber 110 and the supply portion 120, the stirring component 130, and the opposing plate 140 disposed in the stirring chamber 110 are cleaned. The cleaning manner is to, for example, introduce a cleaning liquid (for example, water) for cleaning according to the supply action in the introducing step S1, the stirring action in the mixing step S2, and the discharging action in the transporting step S3, and discharge the used cleaning liquid. In other words, the cleaning liquid is introduced into the stirring chamber 110 via the supply portion (which may be originally present or additionally added), and the stirring component 130 is rotated to stir the cleaning liquid, so as to clean the stirring chamber 110 and the supply portion 120, the stirring component 130, and the opposing plate 140 disposed in the stirring chamber 110. At this time, the opposing plate 140 disposed on the stirring component 130 can also be sufficiently cleaned and does not form a region that is difficult to be cleaned in the stirring chamber 110. Subsequently, the used cleaning liquid is discharged via the discharging portion (which may be originally present or additionally added). In this way, residue of the mixed liquid can be effectively prevented, and the use of the liquid mixing device 100 for the next time will not be affected. However, the disclosure is not limited thereto, which may be adjusted according to requirements.

In summary, in the liquid mixing device and the liquid mixing method of the disclosure, the opposing plate is disposed on the stirring component and is disposed opposite to the supply portion, such that in the introducing step of supplying the liquids into the stirring chamber, the stirring component is controlled, so that the opposing plate disposed on the stirring component is disposed opposite to the supply portion. In this way, during the introducing process of the liquid, the liquid supplied into the stirring chamber collides against the opposing plate disposed on the stirring component, thereby preventing the liquid from scattering and suppressing generation of air bubbles. In addition, the opposing plate disposed on the stirring component does not form a region that is difficult to be cleaned in the stirring chamber. Preferably, the size of the opposing plate is greater than the size of the opening as the supply portion, and the opposing plate is formed in the concave shape in the direction from the supply portion toward the stirring component, so as to increase the effect of the liquid colliding against the opposing plate, thereby more effectively suppressing generation of air bubbles. Accordingly, the liquid mixing device and the liquid mixing method of the disclosure can suppress air from being mixed into the liquid to generate air bubbles, and the structure is easy to clean, so that a high-quality mixed liquid can be obtained.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. A liquid mixing device, suitable for mixing a plurality of liquids, comprising:

a stirring chamber;

a supply portion, disposed on an inner surface of the stirring chamber to supply the liquids into the stirring chamber;

a stirring component, disposed in the stirring chamber to stir the liquids supplied into the stirring chamber; and an opposing plate, disposed on the stirring component and disposed opposite to the supply portion, wherein the supply portion comprises an opening disposed on the inner surface of the stirring chamber, the opening is configured to face the opposing plate along a radial direction of the stirring chamber when the opposing plate is opposite to the supply portion, and the opposing plate is configured to have a size along a circumferential direction of the stirring chamber greater than a size of the opening along the circumferential direction when the opposing plate is opposite to the supply portion.

2. The liquid mixing device according to claim 1, wherein:

a plurality of supply portions are disposed on the inner surface of the stirring chamber, the opposing plate is moved to be disposed opposite to the supply portion supplying the liquid among the supply portions.

3. The liquid mixing device according to claim 1, wherein:

the stirring chamber is formed in a cylindrical shape, the stirring component comprises a rotating shaft extending along an axial direction of the stirring chamber and a blade portion extending radially outward from the rotating shaft, and the opposing plate is disposed at a front end of the blade portion.

4. The liquid mixing device according to claim 1, wherein:

the opposing plate is formed in a concave shape recessed in a direction from the supply portion toward the stirring component.

5. The liquid mixing device according to claim 3, wherein:

the opposing plate is configured to be moved via rotation of the stirring component, and the stirring component is configured to stop rotating when the liquid is being supplied into the stirring chamber, so that the opposing plate is disposed opposite to the supply portion supplying the liquid.

6. The liquid mixing device according to claim 4, wherein:

the concave shape of the opposing plate is V-shaped.

* * * * *